United States Patent [19]

Flynt

[11] 3,831,373
[45] Aug. 27, 1974

[54] PUMPED AIR STORAGE PEAKING POWER SYSTEM USING A SINGLE SHAFT GAS TURBINE-GENERATOR UNIT

[75] Inventor: Frank V. Flynt, Schenectady, N.Y.
[73] Assignee: General Electric Company, Schenectady, N.Y.
[22] Filed: Feb. 8, 1973
[21] Appl. No.: 330,604

[52] U.S. Cl............ 60/39.33, 60/39.07, 60/39.18 B, 60/39.58, 290/52, 61/.5
[51] Int. Cl............................................. F02c 3/12
[58] Field of Search......... 60/39.07, 39.02, 39.16, 60/39.54, 39.58, 39.74, 39.18 B, 39.18 C, 39.33; 290/52, 2; 61/.5

[56] References Cited
UNITED STATES PATENTS

| | | | |
|---|---|---|---|
| 2,433,896 | 1/1948 | Gay | 290/52 |
| 2,511,854 | 6/1950 | Kane | 290/52 |
| 3,151,250 | 9/1964 | Carlson | 60/39.16 R |
| 3,394,265 | 7/1968 | Hendrickson | 290/52 |
| 3,625,003 | 12/1971 | Liddle et al. | 60/39.16 R |
| 3,631,673 | 1/1972 | Cherrier | 60/39.18 B |
| 3,643,426 | 2/1972 | Janelid | 60/39.02 |
| 3,659,417 | 5/1972 | Grieb | 60/39.07 |
| 3,729,930 | 5/1973 | Williams | 60/39.58 |
| 3,757,517 | 9/1973 | Rigollot | 60/39.18 R |

FOREIGN PATENTS OR APPLICATIONS

| | | | |
|---|---|---|---|
| 901,719 | 7/1949 | Germany | 60/39.07 |
| 1,209,936 | 9/1959 | France | 60/39.07 |

OTHER PUBLICATIONS
Mechanical Engineering, Vol. 92, No. 11, Nov. 1970, pgs. 20–24.

Primary Examiner—William L. Freeh
Assistant Examiner—Warren Olsen
Attorney, Agent, or Firm—Erwin F. Berrier, Jr.

[57] ABSTRACT

A pumped air storage peaking power system is disclosed which comprises a standard single shaft gas turbine-generator unit used in conjunction with a system of valves. The system may be operated in pumping mode for air storage, in peaking mode as an extra-power gas turbine operating with stored compressed air, or as a conventional gas turbine operating with ambient air, all through appropriate valve settings.

5 Claims, 2 Drawing Figures

PUMPED AIR STORAGE PEAKING POWER SYSTEM USING A SINGLE SHAFT GAS TURBINE-GENERATOR UNIT

BACKGROUND OF THE INVENTION

1. Field of the Invention

The invention relates generally to a pumped storage peaking power generation system and more particularly to such a system employing a conventional single shaft gas turbine driving a generator.

2. Description of the Prior Art

The use of supplemental "peaking" generators to provide additional power to an electrical network during periods of heavy demand is well known. A great deal of interest has been aroused over the use of pumped air storage peaking power where stored compressed air is utilized, as needed, to furnish combustion-supporting air to drive a standby gas turbine connected to a generator and thereby generate electricity. In such systems, during periods of lower demand, air is compressed by an air compressor and pumped to an air reservoir for storage. The compressed air remains in the reservoir until such time as the electrical network is subjected to periods of increased, heavy demand. Then, the compressed air is drawn from the reservoir, combined with fuel to produce gaseous combustion products, and passed to a standby turbine-generator system where the gaseous combustion products drive the turbine. The turbine, in turn, drives the generator to produce the additional power needed to supply the electric network.

One type of pumped air storage peaking power system that has been disclosed in U.S. Pat. No. 3,151,250 issued to H. A. Carlson and in British Pat. No. 671,539 comprises a pair of units; a motor-compressor unit and a turbine-generator unit. The units are used at different times since there is no need to expend power to compress air while the turbine is operating off a stored supply of air. Air is compressed by the compressor when the demand for power is low since the motor driving the compressor must draw power from the electrical network to function. The turbine is not then needed. When the demand is high, the turbine drives the generator to produce the needed electricity. It is not desirable to drain the network of electricity to run the compressor at this time.

Such a twin-unit system is disadvantageous because two separate, independent units are required; each unit itself comprises a pair of components. Such units must be specially designed, whereas single shaft gas turbines are readily available as standard units.

Another type of pumped air storage peaking power system that has been disclosed comprises a single unit. A turbine and a compressor are coupled through a pair of clutch mechanisms to a single dynamoelectric machine so that, in the alternative, the dynamoelectric machine may selectively be used as a motor to drive the compressor to compress air or in another mode it may serve as a generator to be driven by the turbine to generator electricity. It is desirable, in such a coupled peaking power system, that the dynamoelectric machine be uncoupled from the compressor when the turbine is driving and, similarly, that the dynamoelectric machine be uncoupled from the turbine when the compressor is being driven. Thus, the component that is not needed remains inoperative and does not impose an unnecessary load on the system which load would otherwise reduce its overall efficiency.

Such a single unit, coupled system is disadvantageous because it requires a special design and because of the necessity of providing a pair of clutch mechanisms, which, in a large rating would be quite expensive.

There is available a conventional "single shaft" gas turbine which has a compressor and turbine mounted on common shaft means which are adopted to be directly connected to a load device. "Single shaft," as used herein, means that the turbine supplies power for the compressor as well as the load device and that the load device, compressor and turbine must all rotate together. This is contrasted to a "two shaft" gas turbine, wherein the compressor and one turbine section are on one shaft, while a separate turbine section is connected to the load device on another tandem shaft. In the single shaft gas turbine, the compressor runs at the same speed as all of the turbine blades to continuously supply the proper flow rate of compressed air which is almost immediately combined with fuel to produce gaseous combustion products needed to drive the turbine. Such conventional designs also are often designed for use in conjunction with a regenerator wherein the compressed air is withdrawn and heated in a separate heat exchanger by the turbine exhaust gases and then returned to the combustor.

In such a conventional gas turbine two-thirds of the turbine's power is required to drive the compressor drawing in air at atmospheric pressure. The remaining one-third of the turbine's power is available to drive the generator to produce electricity. It would normally be disadvantageous to incorporate such a unit, as is, into a pumped air storage peaking power system, because of the inherent inefficiency. During high demand periods, when extra power is needed, the compressor would be needlessly compressing air.

By the present invention, an efficient pumped air storage peaking power system incorporating a standard single shaft gas turbine unit driving a generator is employed, but the above disadvantages are avoided through the use of a system of valves including a throttling valve for the purpose of reducing compressor load on the turbine. Throttling valves have been suggested in the prior art for single shaft gas turbine-generator units used on a spinning reserve basis in U.S. Pat. No. 3,394,265 issued to R. L. Hendrickson. When such prior art units are on spinning reserve, it is desirable that the gas turbine operate at no-load or minimum load conditions so as to consume the least amount of fuel. Such load conditions on the turbine are achieved by reducing the load of the compressor on the turbine through a throttling process whereby air flow through the compressor is reduced. However, in this case air flow through the turbine also is reduced so that power generated is at a minimum or even absorbed by the unit in some cases. No such application of a throttling valve is known in a single shaft gas turbine-generator unit incorporated in a pumped air storage peaking power system, where maximum power is to be generated by the turbine during the throttling process.

An object of this invention is to provide a peaking power system capable of efficient operation and available at a reduced cost.

A further object of this invention is to incorporate such a conventional single shaft gas turbine driving a dynamoelectric machine in a peaking power system without the necessity of substantially redesigning those units, and which is also capable of operation as a conventional gas turbine-generator unit.

Another object of the invention is to provide an improved peaking power system, by combining with the aforementioned units an effective arrangement of valves and conduits external to the unit.

Finally, it is an object of the invention to provide a peaking power system which levels out the power demands on the utility system, and particularly which reduces the amount of turbine power needed to drive the compressor during periods of heavy demand on the electrical network when it is desirable to drive the generator with the turbine to generate needed electricity, and which also reduces the amount of motor power needed to drive the turbine during periods of lower demand on the electrical network when it is desirable to drive the compressor with the motor.

SUMMARY OF THE INVENTION

In accordance with this invention a pumped air storage peaking power system is provided which uses a standard type of single shaft gas turbine driving a generator, modified in the following manner. A valve, communicating with the gas turbine inlet, is operable to selectively throttle air flow to the compressor. In the pumping mode, an air reservoir communicating with the compressor outlet receives compressed air therefrom through another valve and stores that air. A heat exchanger, communicating with the compressor and the reservoir, may be used to cool air passing from the compressor to the reservoir while generating steam for reducing turbine windage. In the peaking mode, valves communicating with the reservoir and the combustor selectively control passage of compressed air from the reservoir to the combustor, while the throttling valve and other valves are set to reduce the load otherwise imposed by the compressor.

DESCRIPTION OF THE PREFERRED EMBODIMENT

Figure 1:
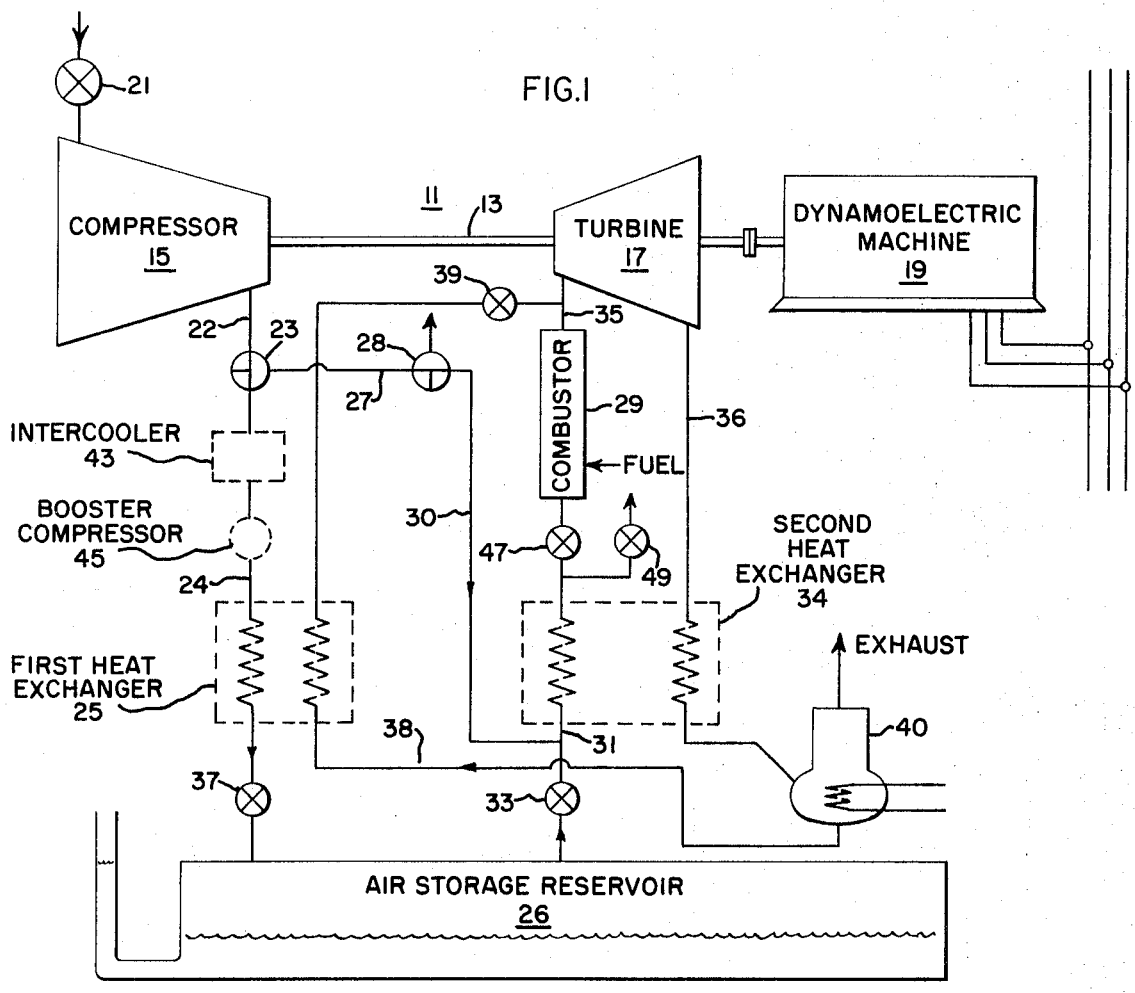
FIG. 1 is a schematic representation of a pumped air storage peaking power system according to this invention.

One preferred embodiment of the invention is shown in FIG. 1. A pumped air storage peaking power system 11 is shown which incorporates a single shaft gas turbine of the regenerative type driving a dynamoelectric machine. However, the system is not limited to the use of a regenerator. The system 11 is operable as an air compressor in the pumping mode, as a special peaking gas turbine in the peaking mode, or as a conventional gas turbine-generator unit.

The system comprises a single rotating shaft 13 connecting a compressor 15 and a turbine 17. A dynamoelectric machine 19 is directly connected to the gas turbine output shaft, either through a coupling or reduction gears. A throttling valve 21 is disposed in communication with the inlet of the compressor 15, for the purpose of selectively throttling air flowing into the compressor. It is a feature of the invention to employ such throttling when the compressor is not needed, so as to reduce the air pressure at the compressor inlet to approximately one-tenth of an atmosphere. Compressor windage losses, equal to the turbine power needed to drive the compressor when it is needlessly operated, are thus greatly reduced because the compressor's rotating structure operates against a much reduced air resistance. It has been found that there is a linear relationship between the amount of turbine power needed to drive the compressor and the air pressure at the compressor inlet. By reducing the compressor inlet air pressure down to one-tenth of an atmosphere, from the typical pressure of approximately one atmosphere, the power requirements to drive the compressor off the turbine can be reduced to approximately 5 or 6 percent of the turbine's power output. (A conventional single shaft gas turbine requires approximately two-thirds of the turbine's power output to drive the compressor.)

The compressed air exiting the compressor follows conduit 22 to a three-way valve 23 which, in one position, can selectively direct the air along a conduit 24 through a heat exchanger 25 to an air storage reservoir 26. Reservoir 26 is preferably an underground natural reservoir in which air under pressure will displace water to accomplish air storage as indicated in symbolic fashion. The heat exchanger 25 serves to cool the compressed air before it enters the reservoir 26 so that moisture typically found in a natural reservoir formation will not be converted to steam because of heat released by the incoming air.

Alternatively, in another position, the three-way valve 23 can direct the compressed air along a conduit 27 to a valve 28. Valve 28 is also a three-way valve which can selectively exhaust the air to the atmosphere or alternatively direct the air through a conduit 30 to an adjoining conduit 31 which extends between the air reservoir 26 and the combustor 29. The passage of air from the reservoir 26 to the conduit 31 is controlled by a valve 33 which selectively controls the passage of air therethrough. Air entering conduit 31, whether from conduit 30 or from the reservoir 26, passes through a second heat exchanger 34 where it is preheated by gaseous combustion products exhausted from the turbine 17. The now preheated compressed air, exiting from the heat exchanger 34, passes through conduit 31 to the combustor 29 where it is combined with fuel and burned to form gaseous combustion products. These gaseous combustion products are discharged from the combustor and conveyed along a conduit 35 to the turbine 17 where they drive the turbine 17 when the system is operated in the peaking mode. It will be understood that conduit 35, although shown as a pipe, is actually an integral part of the gas turbine, sometimes called a transition piece. The gaseous combustion products are subsequently exhausted from the turbine along conduit 36 which passes through the heat exchanger 34 so that the heat of those gaseous combustion products may be released and supplied to the compressed air passing through the heat exchanger 34 to the combustor. Subsequently, the gaseous combustion products are exhausted to the atmosphere.

Additionally, other apparatus may be provided in the system. A valve 37 may be provided between the heat exchanger 25 and the air storage reservoir 26 to retain the air within the reservoir and keep it from backing up through conduit 24 into the heat exchanger.

Turbine windage losses occur when the compressor is being operated by the dynamoelectric machine in the pumping mode to compress air for storage in the reservoir 26 and the turbine is needlessly rotated. The ambient air creates a resistance to the rotating blades within the turbine which results in a pumping power loss to the compressor of approximately six percent of the power being furnished by the dynamoelectric machine. This is not as significant as the compressor windage losses would be in the pumping mode with no throttling, but efficiency can nevertheless be further improved by reducing such turbine windage losses. By this invention, the losses are reduced by introducing steam at the turbine inlet. Moderate amounts of steam will tend to reduce windage effects and depending upon the design, can actually add net power to the system, i.e., reduce the power required from the dynamoelectric machine to drive the compressor in pumping mode. Such steam is conveniently provided by passing water along a conduit 38 to heat exchanger 25, where the water absorbs heat released by the compressed air passing to storage along conduit 24. The steam is passed from the heat exchanger 25 along conduit 38 to a valve 39, which selectively permits or prevents passage of the steam therethrough into the turbine. Steam exiting from the turbine along conduit 36 may be exhausted to the atmosphere or as shown in FIG. 1, may be condensed in condenser 40 and recirculated through the conduit 38 to provide water for subsequent conversion to steam. This method of providing steam is advantageous because the heat energy which would otherwise be wasted to the atmosphere can be used to improve the efficiency of the system. The turbine windage losses may be reduced down to zero, and may even reduce pumping power requirements depending on the amount of steam injected into the turbine.

The natural conditions of the air storage reservoirs may be such that the air pressure within the reservoir is greater than the pressure to which the incoming air has been compressed by compressor 15, thereby preventing entry by that incoming air. Such reservoir air pressures may range from 100 psia to 1,000 psia. The pressure of air leaving the compressor 15 may be expected to be in the neighborhood of 165 psia, maximum. Therefore, where the reservoir pressure exceeds 165 psia, it is desirable to provide further compression devices to insure that the pressure of the compressed air entering the reservoir is higher than the air pressure in the reservoir. For this purpose, an intercooler 43 and a booster compressor 45 may be provided in the conduit 24 as an option, as shown in dotted lines. The intercooler is effectively a heat exchanger which serves to cool the compressed air so that it may be more readily compressed by the booster compressor 45. The booster compressor 45, disposed downstream of the intercooler, compresses the air to a desired level. The air is then passed through the heat exchanger 25 where it is cooled before entering the reservoir 26.

Finally, a shut-off valve 47 and a venting valve 49 may be inserted between the heat exchanger 34 and the combustor 29 so that air flow to the combustor may be stopped quickly in an emergency by valve 47 and so that air may be vented to the atmosphere through valve 49.

OPERATION

In the pumping mode, system 11 is operated as an air compressor with dynamoelectric machine 19 serving as a motor, drawing power from the electrical system and driving the compressor to pump air to the reservoir. Throttle valve 21 is completely open, three-way valve 23 is set to direct air along conduit 24 through the open valve 37 to air storage reservoir 26. If steam injection is employed to reduce turbine windage losses, water passing through conduit 38 is heated to boiling temperature in the first heat exchanger 25 by the hot compressed air passing to the storage reservoir. Steam generated in heat exchanger 25 is introduced into the turbine through valve 39 and, after expanding through the turbine, is condensed at 40 and recycled. At the end of pumping, valve 37 is closed to retain the compressed air.

In the peaking mode, valve 21 is set to throttle the air entering the system to reduce the pressure of the entering air to approximately one-tenth of an atmosphere. Consequently, air flow is significantly reduced through compressor 15 thereby reducing the power losses in the system. Three-way valve 23 is set to direct air into conduit 27, and three-way valve 28 is set to vent the throttled compressed air to the atmosphere. This vented air may alternatively be used to cool portions of the turbine or combustor, in which case it is still exhausted to region which is substantially at atmospheric pressure.

In order to provide power to the turbine, valve 33 is opened so that the stored compressed air flows at substantially constant pressure from the air storage reservoir 26 through heat exchanger 34 where it is preheated by the turbine exhaust gases before entering the combustor 29. Fuel is burned in the combustor and the gaseous combustion products are expanded through turbine 17 and exhausted from the system. Due to the throttling of the compressor flow, the output from turbine 17 in peaking mode when operated in the above-described fashion is much greater than that which could be obtained from the same unit operated as a conventional gas turbine generator.

The system may also operate as a conventional gas turbine-generator. This is a very useful feature of the invention, since often-times substantial investment is required to construct a natural air storage reservoir and the results are sometimes unpredictable. If, for some reason, the air storage reservoir fails to operate properly, the gas turbine may be operated to generate power in the normal fashion.

In this mode, the throttling valve 21 is completely open, three-way valve 23 is set to direct air into conduit 27 and three-way valve 28 directs air into conduit 30. The compressed air flows through the heat exchanger 34 to combustor 29. Fuel is burned and the gaseous combustion products lead the turbine through the heat exchanger 34 to preheat the incoming air. In this type of operation, the second heat exchanger 34 acts as a normal regenerator or recuperator.

MODIFICATION

Figure 2:
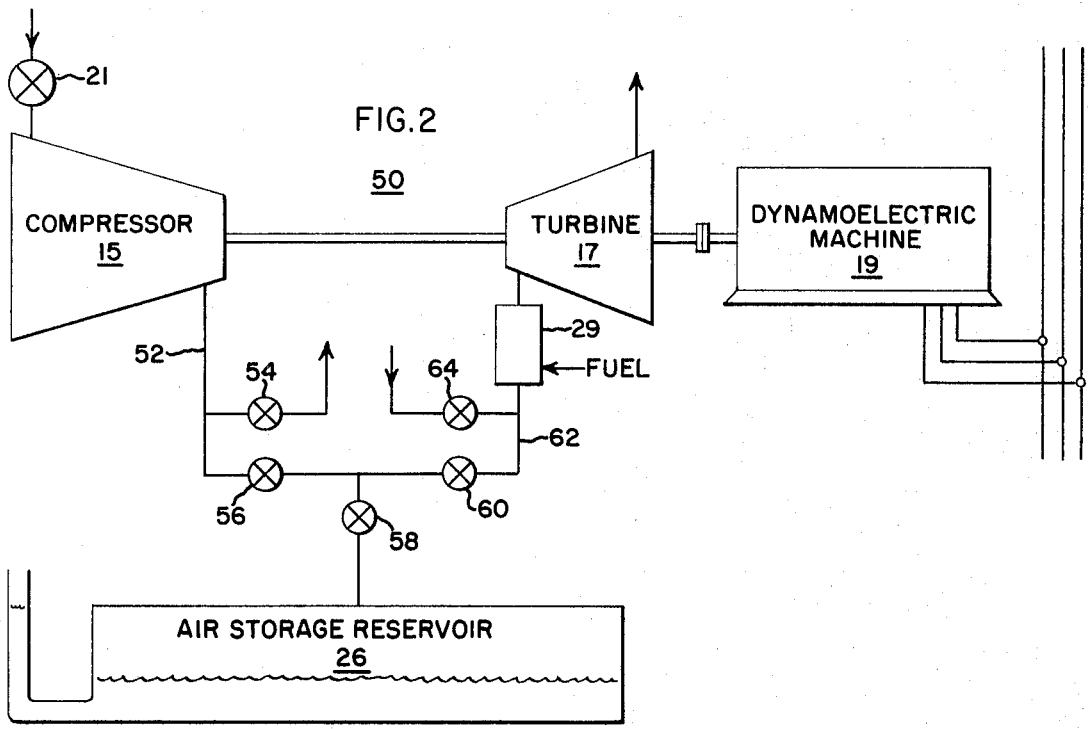
FIG. 2 is a simpler version of the power system omitting some of the heat recovery devices.

An alternate and much simpler version of the invention may be seen by reference to FIG. 2, wherein the system is shown in simplified form. Air leaving the compressor via conduit 52 may flow either through valve 54 to a region of atmospheric pressure or through a valve 56 and a valve 58 to the air storage reservoir 26. Air may also flow from the reservoir via valve 58 and through a valve 60 via a conduit 62 to combustor 29. A valve 64 is connected between conduit 62 and the atmosphere.

In operation, when operating in pumping mode, valves 21, 56, 58 and 64 are open while valves 54, 60 are closed. Air is pumped to the reservoir, while turbine windage losses are reduced by the air flow through valve 64 into and through the turbine 17.

In the peaking mode, valves 58, 60 and 54 are open, valve 64 is closed and valve 21 is set to provide throttling as described previously in connection with the FIG. 1 embodiment.

Finally, when operating as a conventional unit, valves 21, 56, 60 are open while valves 54, 58 and 64 are closed.

Though pumped air storage peaking power systems are known in the literature and are thought to have been built on a prototype basis, standardized forms of such pumped air storage peaking power systems are not currently available. Consequently, if such a system is desired, it would have to be specially designed and built. Such a system could require the engineering of two separate machines, a motor-compressor unit and a turbine-generator unit. In the alternative, if a coupled peaking power system were to be developed, it would require substantial engineering as well as some expensive components. While such a coupled system is somewhat similar to a conventional gas turbine-generator unit in overall configuration, in actuality each of them is highly complex in nature. If it were desired to convert a single shaft gas turbine-generator system to a coupled peaking power system, a great deal more engineering would be involved than merely cutting a single shaft and interposing separable couplings therein. Above and beyond the substantial engineering expenditures there would be substantial expenses for extra parts that would be needed, including a large complex clutching arrangement to connect the two segments of the shaft, as well as additional bearings and bearing mounts. Thus, design and construction time are definite factors in ascertaining some relatively far off future date of availability.

By contrast, this invention, incorporating an existing single shaft gas turbine-generator unit to which no expensive internal restructuring is necessary, provides a relatively inexpensive and quick way to obtain an efficiently operating pump air storage peaking power system. The arrangement of valves and conduits necessary to utilize the existing unit or peaking power operation is entirely external to the unit and requires no changes therein. The approximately 6 percent turbine power drain due to now minimized compressor windage losses is an acceptable level for such a pumped air storage peaking power system and further provides a substantial advance over a similar unthrottled system which would have a 60 to 70 percent turbine power drain. Additionally, the arrangement of valves and conduits system is advantageous because of the flexibility of operation the system has in also operating as a compressor or as a conventional gas turbine-generator unit.

While various embodiments of the invention have been described, it will be obvious to those skilled in the art that changes and modifications may be made without departing from the invention. It is therefore intended in the appended claims to cover all such changes and modifications that fall within the true spirit and scope of this invention.

What is claimed is:

1. A pumped air storage peaking power system comprising:

a conventional single shaft gas turbine engine of the type having a compressor and an axially spaced turbine rigidly connected to a rotatable shaft, said gas turbine engine including a combustor for receiving pressurized air and fuel for generation of a hot gas stream for driving said turbine;

a dynamoelectric machine directly and rigidly connected to said gas turbine engine shaft, said dynamoelectric machine adapted to be driven by said engine shaft and generate electrical power in a first mode of operation, and to receive electrical power and drive said engine shaft in a second mode of operation;

an air storage reservoir, having an inlet and an outlet, for receiving, storing and dispensing compressed air;

first valve means for communicating compressed air from said compressor with said air storage reservoir inlet when said dynamoelectric machine is operating in said second mode and for closing said communication when said dynamoelectric machine is operating in said first mode;

second valve means for communicating compressed air from said storage reservoir outlet with said combustor when said dynamoelectric machine is operating in said first mode, and for closing said communication when said dynamoelectric machine is operating in said second mode; and throttling valve means for restricting air flow to said compressor when said dynamoelectric machine is operating in said first mode;

whereby windage losses in the compressor are sufficiently reduced when said dynamoelectric machine is operating in said first mode to enable a conventional gas turbine to be effectively employed in the air storage system.

2. The pumped air storage peaking power system of claim 1 further characterized by and including means for generating steam and fourth valve means associated therewith for delivering said steam to said turbine when said dynamoelectric machine is operating in said second mode to thereby reduce turbine windage losses.

3. The pumped air storage peaking power system of claim 2 wherein said means for generating steam comprise a heat exchanger disposed between said compressor and said air storage reservoir.

4. A pumped air storage peaking power system comprising:

a single shaft gas turbine having a compressor and a turbine both directly connected to a dynamoelectric machine through rotatable shaft means, first throttling valve means in communication with said compressor, said first valve operable to selectively throttle air flow to said compressor, an air reservoir in communication with said compressor for receiving and storing compressed air from said compressor, a first heat exchanger in communication with said compressor and said reservoir, compressed air passing to said reservoir from said compressor being cooled by first passing through said heat exchanger to release heat, a combustor in communication with said turbine, said combustor combining fuel and compressed air supplied by the compressor to produce gaseous combustion products which are conveyed to said turbine to drive it, second and third valves, said second valve being in communication with said air compressor, said air reservoir and said third valve, compressed air exiting from said compressor being directed by said second valve selectively to either said reservoir or to said third valve, said third valve also being in communication with said combustor, said compressed air passing to said third valve being selectively directed thereby either into said combustor or to a region of substantially atmospheric pressure, a fourth valve disposed in communication with said reservoir and said combustor, said fourth valve selectively controlling passage of compressed air from said reservoir to said combustor;

a second heat exchanger in communication with said compressor, said combustor and said turbine, compressed air directed to said combustor from said compressor first passing through said second heat exchanger for preheating, gaseous combustion products discharged from said turbine being directed through said second heat exchanger to supply heat to said compressed air; and means for conducting water through said first heat exchanger in heat exchange relation with said compressed air to cause conversion of said water to steam and also comprising a fifth valve in communication with said first heat exchanger to selectively control passage of steam from said first heat exchanger into said turbine.

5. The system of claim 4 wherein:
a. when said system is operating as a peaking power system said first valve is set to throttle air flow to said compressor and said fourth valve is open to supply compressed air from said reservoir to said combustor, gaseous combustion product from said combustors being directed to said turbine,
b. when said system is operating as a conventional gas turbine unit, said first valve is set in its fully open position and said fourth valve is closed, and said second and third valves are set to direct compressed air from said compressor to said combustor, gaseous combustion product from said combustor being directed to said turbine, and
c. when said system is operating as an air compressor, said second valve is set to direct air to said reservoir and said fourth valve is closed.

* * * * *